Aug. 10, 1948.    C. C. COONS    2,446,636
REFRIGERATION
Filed Oct. 2, 1943    2 Sheets-Sheet 2

Inventor
Curtis C. Coons
by Harry S. Demarse
Attorney.

Patented Aug. 10, 1948

2,446,636

UNITED STATES PATENT OFFICE 2,446,636

REFRIGERATION

Curtis C. Coons, North Canton, Ohio, assignor to The Hoover Company, North Canton, Ohio, a corporation of Ohio Application October 2, 1943, Serial No. 504,678

14 Claims. (Cl. 62—118)

This invention relates to the art of refrigeration and more particularly to an improved refrigeration system of the intermittently operating unit type designed to produce a continuous refrigerating effect.

More particularly it is an object of the present invention to provide a refrigerating system of the above-described character in which the main refrigerant fluid is also utilized for cooling the absorber-generators during the absorption period thereof and in which a single ultimate heat rejecting element serves to reject the heat of condensation of the refrigerant produced in all absorber-generators and also to reject the heat of absorption produced in all absorber-generators during the absorption cycle thereof.

It is a further object of the present invention to provide a multiple unit intermittent type refrigerating system designed to produce intermittent continuous refrigeration so constructed and arranged that substantially continuous defrosting is produced in various parts of the evaporator so as to obtain a high humidity in the food storage chamber and to reduce loss in efficiency of the apparatus due to insulation of the heat absorbing parts thereof by frost coats.

It is a further object of the present invention to provide a novel evaporator construction for use with multiple unit intermittent refrigerating apparatuses designed to be continuously defrosting and to produce refrigeration continuously.

Other objects and advantages of the invention will become apparent as the description proceeds when taken in connection with the accompanying drawing in which.

Figure 1:
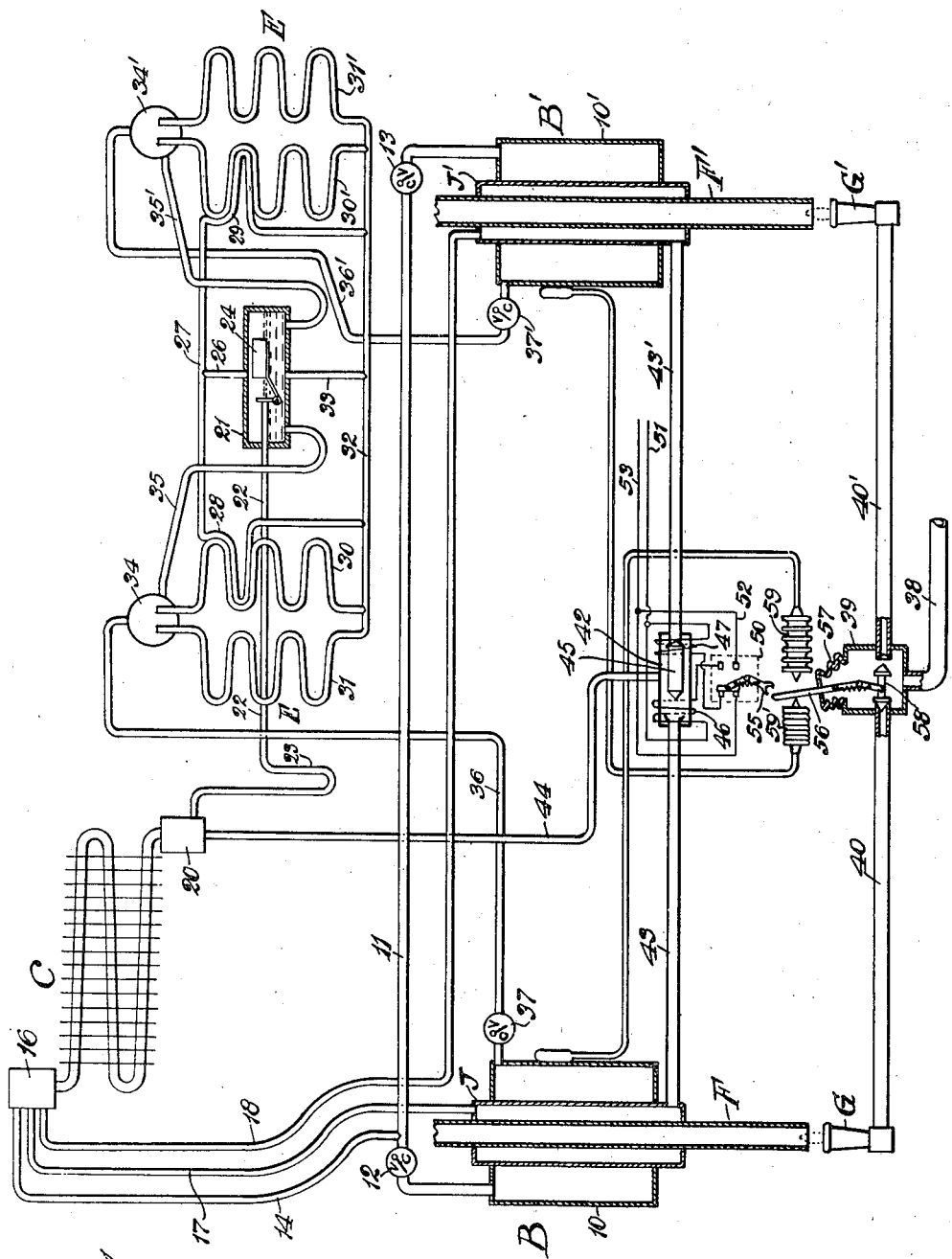
Figure 1 is a diagrammatic representation of the refrigerating apparatus embodying the present invention.

Referring now to the drawing in detail and first to Figure 1 thereof, there is illustrated a pair of absorber-generators B and B' which are identical in structure and operation. Only the absorber-generator B will be described in detail. It will be understood that corresponding primed reference characters refer to correspondingly identical parts of the absorber-generator B'.

The absorber-generator B consists of an outer chamber 10 designed to contain a solid absorbent which is mounted on a multiplicity of trays therein contained in the manner taught, for example in British Letters Patent 530,061, complete specification accepted December 4, 1940. A central heating flue F passes through the central portion of the assembly B for heating the absorbent therein contained. The heating flue F is surrounded by an annular cooling jacket J for cooling the absorber-generator during the absorption phase thereof.

The absorber-generators B and B' have the upper ends thereof connected by a conduit 11 containing non-return check valves 12 and 13 of any desired type. The check valves 12 and 13 are so arranged that vapor may freely pass from the absorber-generators B and B' into that portion of the conduit 11 between the check valves but may not pass backwardly into the absorber generators B and B'. The central portion of the conduit 11 between the check valves 12 and 13 communicates with a conduit 14 connected to a chamber 16 which discharges at its lower end into the upper end of a tubular air cooled condenser C.

The cooling jackets J and J' are connected to the vessel 16 by conduits 17 and 18, respectively.

The condenser C discharges at its lower end into a liquid collection vessel 20. Liquid is conveyed from the vessel 20 to an evaporator collection vessel 21 by means of a conduit 22 having a U-shaped gas sealing liquid trap 23 therein. The conduit 22 is provided with any desired type of expansion device, such as an expansion valve, capillary tube, orifice, or the like. As illustrated, a float valve 24 is mounted within the vessel 21 and is arranged to allow liquid to flow into vessel 21 from pipe 22 when the level in vessel 21 drops below a predetermined minimum value.

The apparatus includes evaporators E and E' associated with the elements B and B', respectively. Since the evaporators E and E' are identical only one will be described in detail as similar reference characters refer to identical parts.

The evaporator E comprises vertically extending sinuous air-cooling and freezing conduits 31 and 30, respectively. The upper portions of the conduits 30 and 31 discharge into the separation vessel 34 and the lower ends of the air-cooling and freezing conduits of the evaporators E and E' are connected by a conduit 33 to the lower central portion of the collection vessel 21.

The lower portion of the vessel 34 is connected to the lower portion of the vessel 21 by a conduit 35 which is shaped to form a deep U-shaped liquid trap extending substantially to the bottom portion of the evaporator E.

The collection vessel 21 receives warm liquid from the condenser and very cold liquid from the evaporator return conduits 35, 35'. Since all the liquid in the vessel 21 in on the low pressure side of the system, sufficient evaporation occurs therein to cool the liquid contents substantially to the temperature prevailing in the refrigerating evaporator unit. The vapor thus formed flows through conduit 26 into conduit 27. The ends of conduit 27 communicate with the upper portions of condenser conduits 28 and 29 associated with the freezing coils 30 and 30', respectively. The condensing conduits 28 and 29 lie along and in contact with the upper convolutions of the freezing coils above the liquid level maintained in the vessel 21 by the float valve structure and are connected at their lower ends to the conduit 32.

The upper portion of vessel 34 is connected to the upper portion of the chamber 10 by a conduit 36 which includes a non-return check valve 37. The non-return valve 37 may be any desired type, such as a ball check or the like, arranged to allow passage of vapor through conduit 36 into the vessel 10 and to prevent egress of vapor from vessel 10 through conduit 36.

The absorber generators B and B' are heated by any suitable means such as combustible fuel burners G and G', respectively. Fuel is supplied to the burners G and G' from a supply conduit 38, diversion valve structure 39, and conduits 40, 40' in a manner to be described more fully hereinafter.

The lower ends of jackets J and J' are connected to a diversion valve chamber 42 by conduits 43, 43', respectively. Refrigerant liquid is supplied from the condenser to the valve chamber 42 by means of conduit 44. The valve structure in chamber 42 may be of any desired type. As herein diagrammatically illustrated, a magnetic reciprocable valve member 45 is mounted within chamber 42 and is arranged to close communication between conduits 43 or 43' and the chamber 42. Suitable solenoid windings 46 and 47 are wound on the left and right hand ends, respectively, of chamber 42 for actuating the magnetic valve member.

A double pole double throw switch 50 is provided for governing the energization of the solenoid windings 46 and 47. The winding 46 is connected directly to the line wire 51 and to the right hand poles, as viewed in Figure 1, of switch 50 which are connected by conductor 52 to the line conductor 53. The solenoid winding 47 is connected to the left hand poles, as viewed in Figure 1, of the switch 50 which are connected to the line conductor 53.

The switching mechanism 50 is of the snap-acting type and is provided with an actuating lever 55 positioned to be engaged by the actuating lever 56 of gas valve mechanism 39. The lever 56 extends through a flexible bellows seal 57 into the interior of chamber 39 where it actuates a snap-acting switch-over valve 58 whereby to supply fuel to the burner G or G'.

Thermostatic mechanisms 59 and 59' are associated with and respond to the temperatures of the absorber generators B and B', respectively. The mechanisms 59 and 59' include expansible bellows elements positioned on opposite sides of lever 56 in operative relationship therewith. Any desired mechanism, preferably one responsive to the temperature of the evaporator or of the space undergoing cooling, will be provided to govern the flow of fuel through conduit 38 into the valve chamber 39. Also any desired pilot or igniting mechanism, not shown, may be supplied for the burners G and G'.

In the operation of the above-described mechanism and with the control in the position illustrated, fuel is supplied to the burner G' to evolve refrigerant vapor from the absorbent in the absorber generator B'. Switch mechanism 50 has energized coil 47 to draw the valve 45 to the position shown, thereby interrupting communication between conduits 44 and 43' and allowing communication between conduits 44 and 43.

The application of heat to the absorber-generator B' evolves refrigerant vapor, such as ammonia, from the absorbent and absorbed refrigerant, such as strontium chloride ammoniate, therein contained. The vapor so evolved passes upwardly in the conduit 11 through check valve 13 and thence through conduit 14, chamber 16, into condenser C wherein it is liquefied by flowing into heat exchange relationship with cooling air. The liquid formed in the condenser C flows into collecting vessel 20 from which a portion of it is withdrawn through conduit 23 into the evaporator collecting vessel 21 by operation of the float valve 24.

The pressure in the absorber-generator B' is the same as that in the condenser C and the check valve 37' is in closed position, thus closing communication between evaporator E' and absorber-generator B'. This will prevent vaporization of refrigerant in the evaporator E'.

The liquid refrigerant collecting in vessel 21 flows through conduits 33 and 32 into the rising conduits 30 and 31 of the evaporator E wherein this liquid receives heat from the objects of refrigeration and evolves refrigerant vapor. The vapor so produced lifts unevaporated liquid through the coils 30 and 31 into the chamber 34 by vapor lift action. The unevaporated liquid returns to vessel 21 through conduit 35 and the evolved refrigerant vapor flows through conduit 36 and check valve 37 into the absorber-generator B.

During this operation refrigerant liquid also flows from vessel 20 through conduit 44, valve 42 and conduit 43 into the jacket J, whereby to cool the absorbent salt contained in chamber 10. The cooled salt in chamber 10 absorbs refrigerant vapor and produces and maintains a reduced pressure in vessel 34 and evaporator E. The refrigerant vapor which flows through valve 37 into the chamber 10 is absorbed by the solid absorbent and the resulting heat of absorption is imparted to the liquid in the jacket J.

The heat applied to the liquid in jacket J evolves refrigerant vapor therefrom which elevates liquid through conduit 17 into chamber 16 and condenser C by vapor lift action. The liquid so elevated flows through the condenser, wherein it is cooled, to vessel 20 for recirculation through the cooling jacket of absorber-generator B. The vapor is condensed to liquid in condenser C and also flows to vessel 20.

The operation of the apparatus utilizing the same fluid as the refrigerant and as the cooling medium for the absorber-generators advantageously utilizes the differences in thermal properties between the refrigerant and the refrigerant salt combination. For example, if strontium chloride is utilized as the absorbent and ammonia is utilized as the refrigerant, the vaporization temperature of pure liquid ammonia at the condensing pressure of the apparatus is within the temperature range to which the strontium chloride must be cooled to absorb ammonia vapor at pressures sufficiently low to produce low (refrigerating) temperature evaporation of the ammonia in the evaporator. Therefore, the high pressure liquid ammonia flowing from the condenser to the cooling jacket of an absorber generator will be vaporized in the cooling jacket at a temperature low enough to induce the strontium chloride to absorb ammonia vapor from the evaporator at a low pressure and temperature.

The above described operation will continue until the salt charge in the absorber generator B' has been substantially relieved of its absorbed refrigerant, at which time its temperature will begin to rise sharply which will result in an expansion of the thermostatic bellows 59' against the actuating arm 56. Previously the bellows 59 will have collapsed due to the progressive lowering of the temperature of the vessel 10 of the boiler absorber generator B. Expansion of the bellows 59' will shift the actuating arm 56 to the right, as viewed in Figure 1, extinguishing burner G' and allowing flow of gas to burner G, de-energizing solenoid 47 and energizing solenoid 46. Energization of solenoid 46 will shift the valve 45 to the left, as viewed in Figure 1, shutting off the supply of liquid refrigerant to the jacket J and allowing the supply of such liquid to jacket J' of boiler B'.

Heat will now be applied to boiler B which will evolve refrigerant vapor in the manner heretofore described in connection with the absorber-generator B'. Similarly boiler B' will now absorb refrigerant vapor produced in the evaporator E' which evaporator now carries the refrigerating load. The evaporator E which was previously operative no longer is subject to circulation of refrigerant and evolution of vapor therein. As a consequence the evaporator E warms up and moisture deposited thereon during its previous refrigerating period melts and vaporizes so as to leave the evaporator E in substantially dry condition. This evaporation of the previously deposited moisture maintains a high humidity within the food storage chamber of the refrigerating apparatus.

During the operation of the apparatus the vapor evolved in the collection vessel 21 flows through conduits 26 and 27 and is condensed in the condenser conduits 28 or 29, depending upon which of the evaporators E and E' are producing refrigeration at any particular time. The condensate so formed flows into conduit 32 and thence to the evaporator which absorbed its heat of condensation. The condenser conduit associated with the non-refrigerating evaporator will contain refrigerant vapor and a small amount of liquid in its lower portion to the same level in which liquid remains in the non-refrigerating evaporator.

This method of purging the vessel 21 and pre-cooling the liquid refrigerant produces refrigerant vapor which is condensed, re-evaporated and then absorbed in the absorber-generator in which it did not originate. This procedure, however, does not upset the balance of the system as each absorber-generator will receive refrigerant from the other periodically during the operation of the system and the net balance will be maintained at all times.

Figures 2, 3:
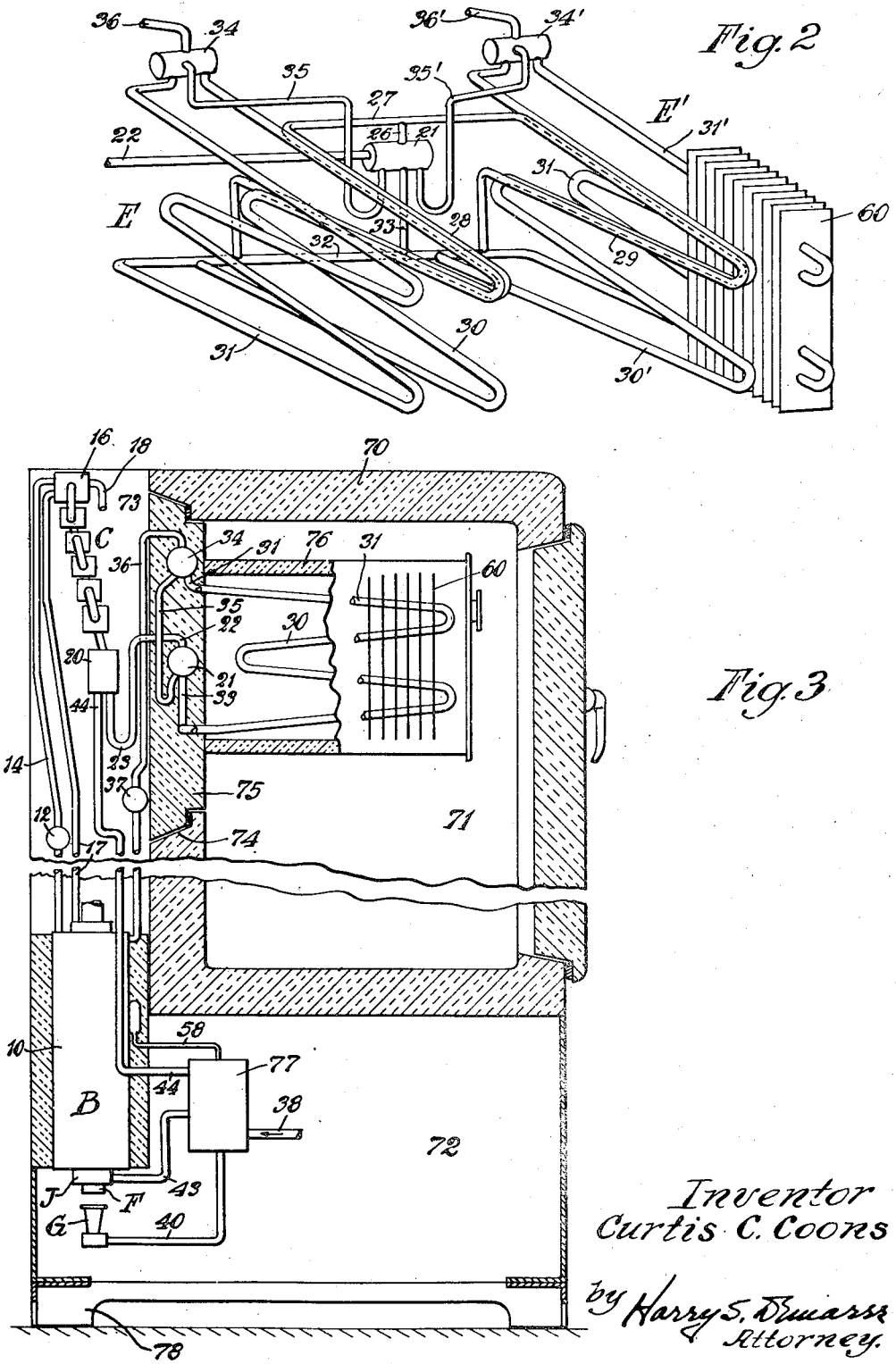
Figure 2 is a perspective view of the evaporator structure.
Figure 3 is a vertical sectional elevation showing the apparatus of the present invention associated with a cabinet for domestic refrigerating purposes.

Referring now to Figure 2 the actual structure and arrangement of the evaporator coils are illustrated in perspective. The evaporator conduits 31, 31' are provided with suitable air cooling fins 60. The coils 30 and 31 extend forwardly of the plane of the vessels 21, 34 and 34' in parallel spaced relation as do the coils 30' and 31'. The evaporators E and E' are then positioned in parallel spaced relationship as is readily apparent from Figure 2.

Referring now to Figure 3 the arrangement of the apparatus in a domestic refrigerating cabinet structure is illustrated. The cabinet structure 70 comprises an insulated refrigerating chamber 71 overlying a lower storage and mechanism chamber 72. The cabinet structure rests upon a suitable supporting base 78 which is open to allow flow of cooling air into the chamber 72. The cabinet is provided with a vertical mechanism chamber cooling air flue 73 extending along its rear wall. The rear wall of the cabinet is provided with an opening 74 which is closed by an insulated panel element 75 attached to and forming part of the refrigerating mechanism.

An insulated freezing chamber 76 extends forwardly from the inner wall of panel 75 and encases the freezing coils 30, 30' of the evaporators E and E'. The condensing structure 26, 27, 28 and 29 is omitted from Figure 3 in the interest of clarity of illustration. It is obvious from an inspection of Figure 2 that the conduits 26 and 27 and the lower vertically extending portions of conduits 28 and 29 will be embedded in the insulation of panel 75. The conduits 28 and 29 which lie along conduits 30 will be within the insulated freezing chamber 76. Suitable supporting shelves, not shown, may be included within the insulated chamber 76 in heat exchange relationship with the conduit 30. If desired, a heat accumulator may be placed in the lower portion of chamber 76 in heat exchange relationship with conduits 30 and 30' to provide highly uniform freezing conditions. The vessels 34, 34' and 21 together with certain of the connecting conduits to the evaporator structure are embedded within the insulation of the panel 75 as shown. The air cooling evaporator coils 31, 31' together with their associated air cooling fins 60 are positioned on the opposite lateral sides of the chamber 76 in spaced relationship therewith.

The absorber generators are positioned in the lower portion of the vertical flue 73 and are encased in insulating material. The control mechanism for the cooling system and for the gas flow system is encased within a control housing 27.

The air cooled condenser C is arranged at an incline in the upper portion of the flue 73 so as to have its upper hottest portion positioned at the greatest distance away from the rear wall of the freezing chamber. The inclined arrangement of the condenser allows cooling of each individual run of the condenser by air previously unheated by heat of condensation.

A suitable supporting frame, not shown, may be provided to maintain the absorber-generators, condenser, panel 75 and evaporator construction in proper position and to form a rigid assembly thereof which can be inserted into the cabinet 70 as a unitary whole.

While the invention has been described and illustrated in detail, various changes may be made in the arrangement, construction and proportion of parts without departing from the spirit of the invention or the scope of the appended claims.

I claim:

1. Refrigerating apparatus comprising a pair of absorber-generators, means associated with each of said absorber generators for absorbing heat therefrom, a heat rejecting element comprising a single cooled path of flow of fluid, means for conducting refrigerant vapor produced in each of said absorber generators and each of said heat absorbing means to said single path of flow of said heat rejecting element, an evaporator structure, means for conducting refrigerant liquid from said heat rejecting element to said evaporator structure and to a selected one of said heat absorbing means, and means for conducting refrigerant vapor from said evaporator structure to a selected one of said absorber-generators.

2. Refrigerating apparatus comprising a plurality of absorber-generator structures, structures for cooling each of said absorber-generators, a single heat rejecting structure (as 2) comprising a single cooled path of flow of fluid for rejecting the heat of condensation of refrigerant vapor evolved in said absorber-generator structures and for rejecting the heat of absorption produced in said absorber-generator structures, a chilling structure and means connecting the above mentioned structures to provide a first path of flow of a working medium including heat adding and heat abstracting portions including said chilling structure and a second path of flow of said working medium excluding said chilling structure.

3. In a refrigerator; a cabinet structure including an insulated refrigerating chamber, a freezing chamber in said refrigerating chamber, a compartment extending vertically along a wall of said cabinet structure and arranged for flow of cooling air therethrough; a refrigerating apparatus associated with said cabinet structure comprising a tubular air cooled condenser in the upper part of said compartment, a pair of absorber-generators in the lower part of said compartment arranged to supply refrigerant vapor to said condenser, cooling means associated with said absorber-generators arranged to supply refrigerant vapor to said condenser, an evaporator structure including parts arranged to refrigerate said refrigerating chamber and parts arranged to refrigerate said freezing chamber, pressure reducing means for translating refrigerant liquid from said condenser to said evaporator structure, means for heating said absorber-generators alternately, means for supplying refrigerant liquid from said condenser to said absorber-generators after heating thereof, and means for conducting refrigerant vapor from said evaporator structure to the absorber-generator being cooled by refrigerant liquid.

4. In a refrigerator; a cabinet structure including an insulated refrigerating chamber having a cooling unit receiving opening, an insulated panel closing said opening, and a freezing chamber extending into said chamber from said panel; a refrigerating apparatus associated with said cabinet structure including a pair of absorber-generators, a condenser connected to receive refrigerant vapor from said absorber-generators, a pair of evaporators arranged to refrigerate said chambers, each of said evaporators having a vapor discharge part embedded in said panel element, a supply vessel embedded in said panel element arranged to receive refrigerant liquid from said condenser and to supply refrigerant liquid to each of said evaporators, and means for conveying refrigerant vapor from each of said vapor discharge parts to an associated absorber-generator.

5. Refrigerating apparatus comprising a pair of absorber-generators, a condenser connected to receive refrigerant vapor from each of said absorber-generators, a pair of evaporators each including a conduit adapted to operate as a vapor lift circulator, a pressure reducing and liquid refrigerant translating device arranged to supply refrigerant liquid to the lower ends of each of said conduits, a vapor discharge chamber connected to the upper end of each of said evaporators, and means for conveying refrigerant vapor from each of said vapor discharge chambers to an associated absorber-generator.

6. In a refrigerator, a condenser for refrigerant, a pair of evaporators, means arranged to withdraw refrigerant vapor from said evaporators alternately, a collecting vessel, pressure reducing means for conveying refrigerant vapor from said condenser to said vessel, means connecting said vessel to said evaporators, and condensing means cooled by said evaporators for condensing refrigerant vapor formed in said vessel.

7. In a refrigerator, a condenser for refrigerant, a pair of evaporators, means arranged to withdraw refrigerant vapor from said evaporators alternately, a collecting vessel, pressure reducing means for conveying refrigerant vapor from said condenser to said vessel, means connecting said vessel to said evaporators, condensing elements associated with each of said evaporators and arranged to be cooled thereby, said condenser means being arranged to receive vapor from said vessel, and means for introducing condensate from said condensing means into said evaporators.

8. Refrigerating apparatus comprising a first generator-absorber, an evaporator, means arranged to conduct refrigerant vapor from said evaporator solely to said generator-absorber and to prevent refrigerant flow in the reverse direction, a second generator-absorber, a second evaporator, means arranged to conduct refrigerant vapor from said second evaporator solely to said second generator-absorber and to prevent refrigerant flow in the reverse direction, a condenser arranged to receive refrigerant vapor to be condensed from each of said generator-absorbers, means for conducting refrigerant liquid from said condenser to each of said evaporators, and means for heating and cooling each of said generator-absorbers alternately and in out-of-phase relationship with respect to each other.

9. Refrigerating apparatus comprising a first generator-absorber, an evaporator, means arranged to conduct refrigerant vapor from said evaporator to said generator-absorber and to prevent refrigerant flow in the reverse direction, a second generator-absorber, a second evaporator, means arranged to conduct refrigerant vapor from said second evaporator to said second generator-absorber and to prevent refrigerant flow in the reverse direction, a condenser arranged to receive refrigerant vapor to be condensed from each of said generator-absorbers, means for conducting refrigerant liquid from said condenser to each of said evaporators, means for heating said generator-absorbers alternately with respect to each other, means for conducting refrigerant liquid from said condenser in heat exchange with each of said generator-absorbers alternately with respect to the heating thereof, and means for conducting refrigerant vapor from said conducting means to said condenser.

10. Refrigerating apparatus comprising a first generator-absorber, an evaporator, means arranged to conduct refrigerant vapor from said evaporator to said generator-absorber and to prevent refrigerant flow in the reverse direction, a second generator-absorber, a second evaporator, means arranged to conduct refrigerant vapor from said second evaporator to said second generator-absorber and to prevent refrigerant flow in the reverse direction, a condenser arranged to receive refrigerant vapor to be condensed from each of said generator-absorbers, means for conducting refrigerant liquid from said condenser to each of said evaporators including a pressure reducing vessel arranged to supply liquid refrigerant to each of said evaporators in common, means in heat exchange with each of said evaporators for condensing refrigerant vapor formed in said pressure reducing vessel and for conducting such condensed refrigerant to said evaporators, and means for heating and cooling each of said generator-absorbers alternately and in out-of-phase relationship with respect to each other.

11. Refrigerating apparatus comprising a first generator-absorber, an evaporator, means arranged to conduct refrigerant vapor from said evaporator to said generator-absorber and to prevent refrigerant flow in the reverse direction, a second generator-absorber, a second evaporator, means arranged to conduct refrigerant vapor from said second evaporator to said second generator-absorber and to prevent refrigerant flow in the reverse direction, a condenser arranged to receive refrigerant vapor to be condensed from each of said generator-absorbers, means for conducting refrigerant liquid from said condenser to each of said evaporators including a pressure reducing vessel arranged to supply liquid refrigerant to each of said evaporators in common, means constructed and arranged to relieve said pressure receiving vessel of vapors formed therein while maintaining a liquid seal between said vessel and said generator-absorbers, and means for heating and cooling each of said generator-absorbers alternately and in out-of-phase relationship with respect to each other.

12. Refrigerating apparatus comprising a pair of absorber-generators, a condenser, means for conducting refrigerant vapor from said absorber-generators to said condenser and for preventing flow from said condenser to said absorber-generators, an evaporator structure, pressure reducing means for translating refrigerant liquid from said condenser to said evaporator structure, means for conducting refrigerant vapor from a first part of said evaporator structure solely to one of said pair of absorber-generators, means for conducting refrigerant vapor from a second part of said evaporator structure separate and distinct from said first part of said evaporator structure solely to the other of said pair of absorber-generators, means for preventing flow of refrigerant vapor from said absorber-generators to said evaporator structure, and means providing for heating and cooling of each of said absorber-generators alternately with respect to each other.

13. Refrigerating apparatus comprising a plurality of absorber-generators, a condenser, a plurality of evaporators, a refrigerant liquid receiving part common to said evaporators, means connecting each of said absorber-generators to receive refrigerant vapor solely from a single evaporator separate and distinct from the evaporators which supply refrigerant vapor to the other absorber-generators, non-return valve means in each of said connecting means to prevent flow of refrigerant vapor from said absorber-generators to said evaporators, means for conducting refrigerant vapor from each absorber-generator to said condenser including non-return valve means to prevent reverse flow of refrigerant vapor, and means for conducting refrigerant liquid from said condenser to said liquid receiving part.

14. Refrigerating apparatus comprising a plurality of absorber-generators, a cooling means associated with each of said absorber-generators, a condenser, a plurality of evaporators, a refrigerant liquid receiving part common to said evaporators, means connecting each of said absorber-generators to receive refrigerant vapor solely from a single evaporator separate and distinct from the evaporators which supply refrigerant vapor to the other absorber-generators, non-return valve means in each of said connecting means to prevent flow of refrigerant vapor from said absorber-generators to said evaporators, means for conducting refrigerant vapor from each absorber-generator to said condenser including non-return valve means to prevent reverse flow of refrigerant vapor, means for conducting refrigerant liquid from said condenser to said liquid receiving part, means for conducting refrigerant vapor from each of said cooling means to said condenser, and means for conducting refrigerant liquid from said condenser to a selected one of said cooling means.

CURTIS C. COONS.

REFERENCES CITED

The following references are of record in the file of this patent:

UNITED STATES PATENTS

| Number | Name | Date |
| --- | --- | --- |
| 462,904 | Miller | Nov. 10, 1891 |
| 1,774,820 | Williams | Sept. 2, 1930 |
| 1,781,758 | Larsen | Nov. 18, 1930 |
| 1,908,413 | Elfving | May 9, 1933 |
| 1,992,745 | Elfving | Feb. 26, 1935 |
| 2,049,413 | Cannon | Aug. 4, 1936 |
| 2,319,806 | Kleen | May 25, 1943 |